United States Patent
Zhou et al.

(10) Patent No.: US 8,467,520 B2
(45) Date of Patent: Jun. 18, 2013

(54) SUBSCRIBER LINE INTERFACE CIRCUIT WITH INTRA-OPERATIONAL STATE SELECTABLE SUPPLY

(75) Inventors: Yan Zhou, Austin, TX (US); Sean A. Lofthouse, Austin, TX (US); Jonathan C. Grigsby, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 335 days.

(21) Appl. No.: 12/910,782

(22) Filed: Oct. 23, 2010

(65) Prior Publication Data
US 2012/0098333 A1 Apr. 26, 2012

(51) Int. Cl.
*H04M 1/00* (2006.01)
(52) U.S. Cl.
USPC ............ 379/400; 379/402; 379/412; 379/413
(58) Field of Classification Search
USPC ............................................ 379/398–413.04
See application file for complete search history.

(56) References Cited

U.S. PATENT DOCUMENTS

| | | | |
|---|---|---|---|
| 2005/0074115 A1* | 4/2005 | George | 379/418 |
| 2009/0243572 A1* | 10/2009 | Mills et al. | 323/282 |
| 2012/0256656 A1* | 10/2012 | Stirk et al. | 326/80 |

* cited by examiner

*Primary Examiner* — Duc Nguyen
*Assistant Examiner* — Ibraham Sharifzada
(74) *Attorney, Agent, or Firm* — O'Keefe, Egan, Peterman & Enders LLP.

(57) ABSTRACT

A method of generating a plurality of supply voltages for a plurality of subscriber line channels includes generating a first target VBAT value for a first associated linefeed driver from a first VBAT control. A second target VBAT value for a second associated linefeed driver is generated from a second VBAT control. A selected target VBAT value is generated based upon the first and second target VBAT values. A magnitude of the selected target VBAT value is not less than any maximum of a magnitude of the first and second target VBAT values. A switching regulator is controlled to provide a first generated VBAT corresponding to the selected target VBAT value, wherein the switching regulator provides a second generated VBAT having a pre-determined proportional relationship (p) to the first generated VBAT.

13 Claims, 6 Drawing Sheets

SUBSCRIBER LINE INTERFACE CIRCUIT WITH INTRA-OPERATIONAL STATE SELECTABLE SUPPLY

BACKGROUND

Subscriber line interface circuits are typically found in the central office exchange of a telecommunications network. A subscriber line interface circuit (SLIC) provides a communications interface between the digital switching network of a central office and an analog subscriber line. The analog subscriber line connects to a subscriber station or telephone instrument at a location remote from the central office exchange.

The analog subscriber line and subscriber equipment form a subscriber loop. The interface requirements of a SLIC result in the need to provide relatively high voltages and currents for control signaling with respect to the subscriber equipment on the subscriber loop. Voiceband communications are low voltage analog signals on the subscriber loop. Thus the SLIC must detect and transform low voltage analog signals into digital data for transmitting communications received from the subscriber equipment to the digital network. For bi-directional communication, the SLIC must also transform digital data received from the digital network into low voltage analog signals for transmission on the subscriber loop to the subscriber equipment.

The SLIC must be provided with a negative voltage supply sufficient to accommodate the most negative loop voltage while maintaining the SLIC internal circuitry in their normal region of operation. In order to ensure sufficient supply levels, a power supply providing a constant or fixed supply level sufficient to meet or exceed the requirements of all of these states may be provided. However, such solutions invariable result in wasted power for at least some operational states.

One supply level is required when the subscriber equipment is "on hook" and another supply level is required when the subscriber equipment is "off hook". Yet another supply level is required for "ringing". A subscriber line interface circuit thus requires different power supply levels depending upon operational state.

One disadvantage of a single fixed power supply architecture is that excess power is generated and must be dissipated as heat or otherwise wasted when a SLIC is not using a power supply level optimized for its particular operational state or for the particular line conditions. For example, the power supply must be capable of supporting the worst-case scenario such as a maximum subscriber line length provided for by specification. In the event the subscriber line is considerably shorter than the maximum expected length, the SLIC will be required to absorb the excess power. The resulting additional thermal load can be problematic for integrated circuits of the SLIC.

One alternative to a single fixed supply is to utilize two fixed supplies. SLIC control circuitry selects between the two fixed supplies based upon operational mode. This approach reduces the amount of excess power wasted at the expense of the operational mode based control circuitry and maintaining two fixed supplies.

More recent architectures utilize switching circuitry (e.g., DC-DC converter) to generate the appropriate supply level (VBAT) from another fixed supply. The switching circuitry can be controlled to track the level needed by the SLIC and provide a variable VBAT. Instead of multiple fixed power supplies to accommodate the different operational states, a single tracking supply varies its output VBAT to meet the SLIC's needs.

The operational states of individual subscriber lines are inherently independent of each other. Each subscriber line may be referred to as a SLIC channel. Each SLIC channel is associated with its own linefeed driver. Providing a single shared fixed supply or providing a shared tracking supply that caters to the neediest channel inherently results in wasted power and heat for devices or channels that do not have the same requirements. Prior art solutions provide separate switching circuitry for each channel or device to reduce the amount of wasted power and heat generation. Each tracking power supply varies its VBAT supply level in accordance with the requirements of its associated channel or device. This tracking power supply architecture is more power efficient than the shared fixed power supply architecture. Given that a tracking power supply is utilized for each channel, however, such an architecture may not be economical to implement—particularly with respect to a large number of channels.

SUMMARY

A method of generating a plurality of supply voltages for a plurality of subscriber line channels includes generating a first target VBAT value for a first associated linefeed driver from a first VBAT control. A second target VBAT value for a second associated linefeed driver is generated from a second VBAT control. A selected target VBAT value is generated based upon the first and second target VBAT values. A magnitude of the selected target VBAT value is not less than any maximum of a magnitude of the first and second target VBAT values. A switching regulator is controlled to provide a first generated VBAT corresponding to the selected target VBAT value, wherein the switching regulator provides a second generated VBAT having a pre-determined proportional relationship (p) to the first generated VBAT.

A method of generating a plurality of supply voltages for a plurality of subscriber line channels includes generating a first target VBAT value for a first associated linefeed driver from a first VBAT control. A second target VBAT value for a second associated linefeed driver is generated from a second VBAT control. A selected VBAT value is generated from the first and second target VBAT values. A magnitude of the selected VBAT value is not less than any maximum of a magnitude of the first and second target VBAT values if the first and second linefeed drivers have a same operational state. The selected target VBAT value is $$\frac{1}{p}$$

times the one of the first and second target VBAT values having the lowest magnitude if the first and second linefeed drivers have different operational states, wherein p<1. A switching regulator is controlled to provide a first generated VBAT corresponding to the selected target VBAT value, wherein the switching regulator provides a second generated VBAT having a pre-determined proportional relationship (p) to the first generated VBAT.

An apparatus for providing a plurality of supply levels to a plurality of subscriber line linefeed drivers includes a switching regulator providing a first generated VBAT corresponding to a selected target VBAT value. The switching regulator provides a second generated VBAT having a pre-determined proportional relationship (p) to the first generated VBAT. A linear regulator receives the first generated VBAT. An output of the linear regulator is coupled to a node supplying a first linefeed driver. A diode couples the node to the second generated VBAT.

Other features and advantages of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
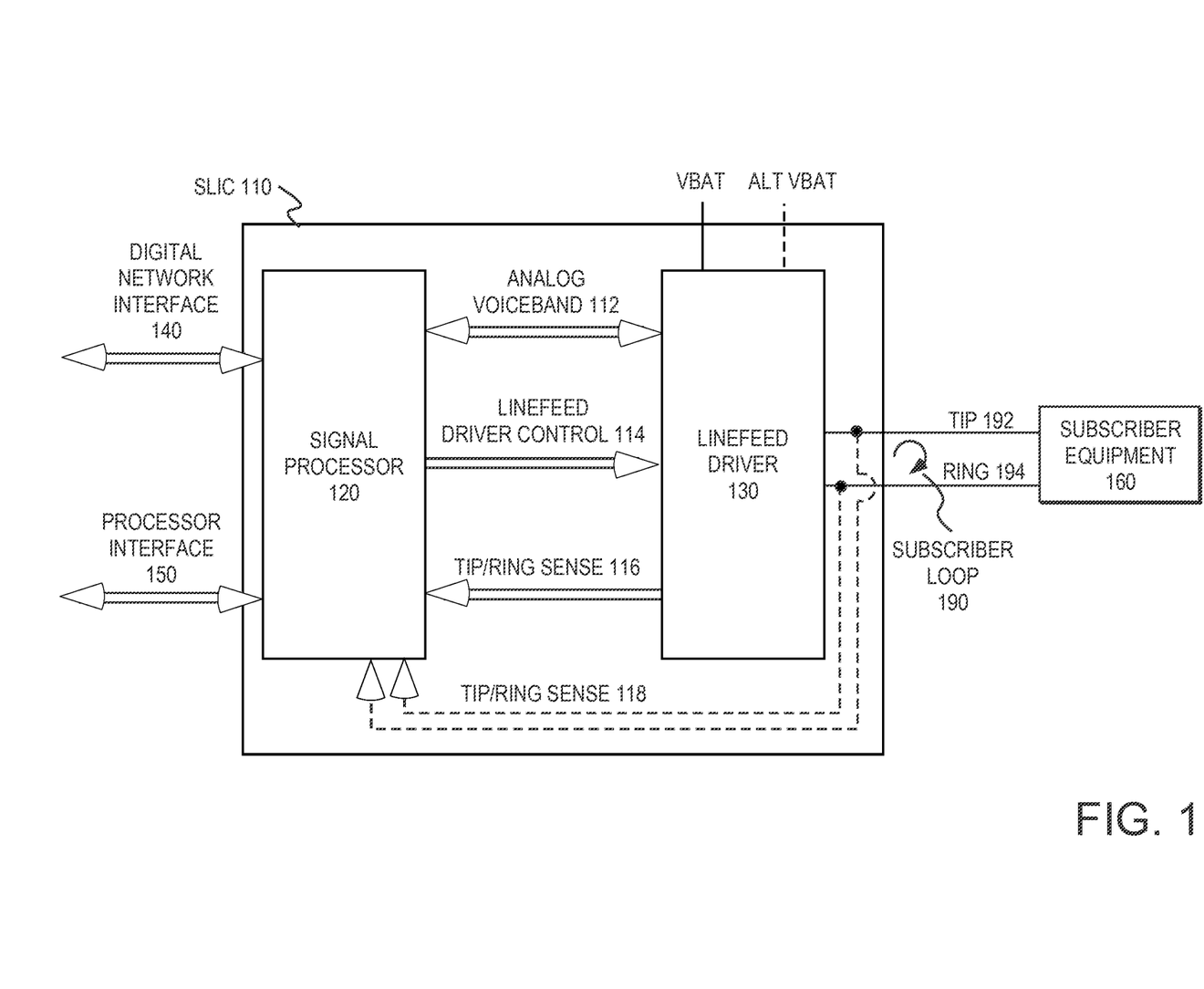
FIG. 1 illustrates one embodiment of a subscriber line interface circuit.

FIG. 1 illustrates one embodiment of a subscriber line interface circuit 110 associated with plain old telephone services (POTS) telephone lines. The subscriber line interface circuit (SLIC) provides an interface between a digital switching network of a local telephone company central exchange and a subscriber line comprising a tip 192 and a ring 194 line. A subscriber loop 190 is formed when the subscriber line is coupled to subscriber equipment 160 such as a telephone.

The subscriber loop 190 communicates analog data signals (e.g., voiceband communications) as well as subscriber loop "handshaking" or control signals. The subscriber loop state is often specified in terms of the tip 192 and ring 194 portions of the subscriber loop.

The SLIC is typically expected to perform a number of functions often collectively referred to as the BORSCHT requirements. BORSCHT is an acronym for "battery feed," "overvoltage protection," "ringing," "supervision," "codec," "hybrid," and "test." The term "linefeed" will be used interchangeably with "battery feed". Modern SLICs may have battery backup, but the supply to the subscriber line is typically not actually provided by a battery despite the retention of the term "battery" to describe the supply (e.g., VBAT).

The ringing function, for example, enables the SLIC to signal the subscriber equipment 160. In one embodiment, subscriber equipment 160 is a telephone. Thus, the ringing function enables the SLIC to ring the telephone.

In the illustrated embodiment, the BORSCHT functions are distributed between a signal processor 120 and a linefeed driver 130. The signal processor and linefeed driver typically reside on a linecard (110) to facilitate installation, maintenance, and repair at a central exchange. Signal processor 120 is responsible for at least the ringing control, supervision, codec, and hybrid functions. Signal processor 120 controls and interprets the large signal subscriber loop control signals as well as handling the small signal analog voiceband data and the digital voiceband data.

In one embodiment, signal processor 120 is an integrated circuit. The integrated circuit includes sense inputs for both a sensed tip and a sensed ring signal of the subscriber loop. The integrated circuit generates subscriber loop linefeed driver control signal in response to the sensed signals. The signal processor has relatively low power requirements and can be implemented in a low voltage integrated circuit operating in the range of approximately 5 volts or less. In one embodiment, the signal processor is fabricated as a complementary metal oxide semiconductor (CMOS) integrated circuit.

Signal processor 120 receives subscriber loop state information from linefeed driver 130 as indicated by tip/ring sense 116. The signal processor may alternatively directly sense the tip and ring as indicated by tip/ring sense 118. This information is used to generate linefeed driver control 114 signals for linefeed driver 130. Analog voiceband 112 data is bi-directionally communicated between linefeed driver 130 and signal processor 120. In an alternative embodiment, analog voiceband signals are communicated downstream to the subscriber equipment via the linefeed driver but upstream analog voiceband signals are extracted from the tip/ring sense 118.

SLIC 110 includes a digital network interface 140 for communicating digitized voiceband data to the digital switching network of the public switched telephone network (PSTN). The SLIC may also include a processor interface 150 to enable programmatic control of the signal processor 120. The processor interface effectively enables programmatic or dynamic control of battery control, battery feed state control, voiceband data amplification and level shifting, longitudinal balance, ringing currents, and other subscriber loop control parameters as well as setting thresholds including ring trip detection and off-hook detection threshold.

Linefeed driver 130 maintains responsibility for battery feed to tip 192 and ring 194. The battery feed and supervision circuitry typically operate in the range of 40-75 volts. The battery feed is negative with respect to ground, however. Moreover, although there may be some crossover, the maximum and minimum voltages utilized in the operation of the battery feed and supervision circuitry (−48 or less to 0 volts) tend to define a range that is substantially distinct from the operational range of the signal processor (e.g., 0-5 volts). In some implementations the ringing function is handled by the same circuitry as the battery feed and supervision circuitry. In other implementations, the ringing function is performed by separate higher voltage ringing circuitry (75-150 $V_{rms}$).

Linefeed driver 130 modifies the large signal tip and ring operating conditions in response to linefeed driver control 114 provided by signal processor 120. This arrangement enables the signal processor to perform processing as needed to handle the majority of the BORSCHT functions. For example, the supervisory functions of ring trip, ground key, and off-hook detection can be determined by signal processor 120 based on operating parameters provided by tip/ring sense 116.

The linefeed driver receives a linefeed supply VBAT for driving the subscriber line for SLIC "on-hook" and "off-hook" operational states. An alternate linefeed supply (ALT VBAT) may be provided to handle the higher voltage levels (75-150 Vrms) associated with ringing.

Figure 2:
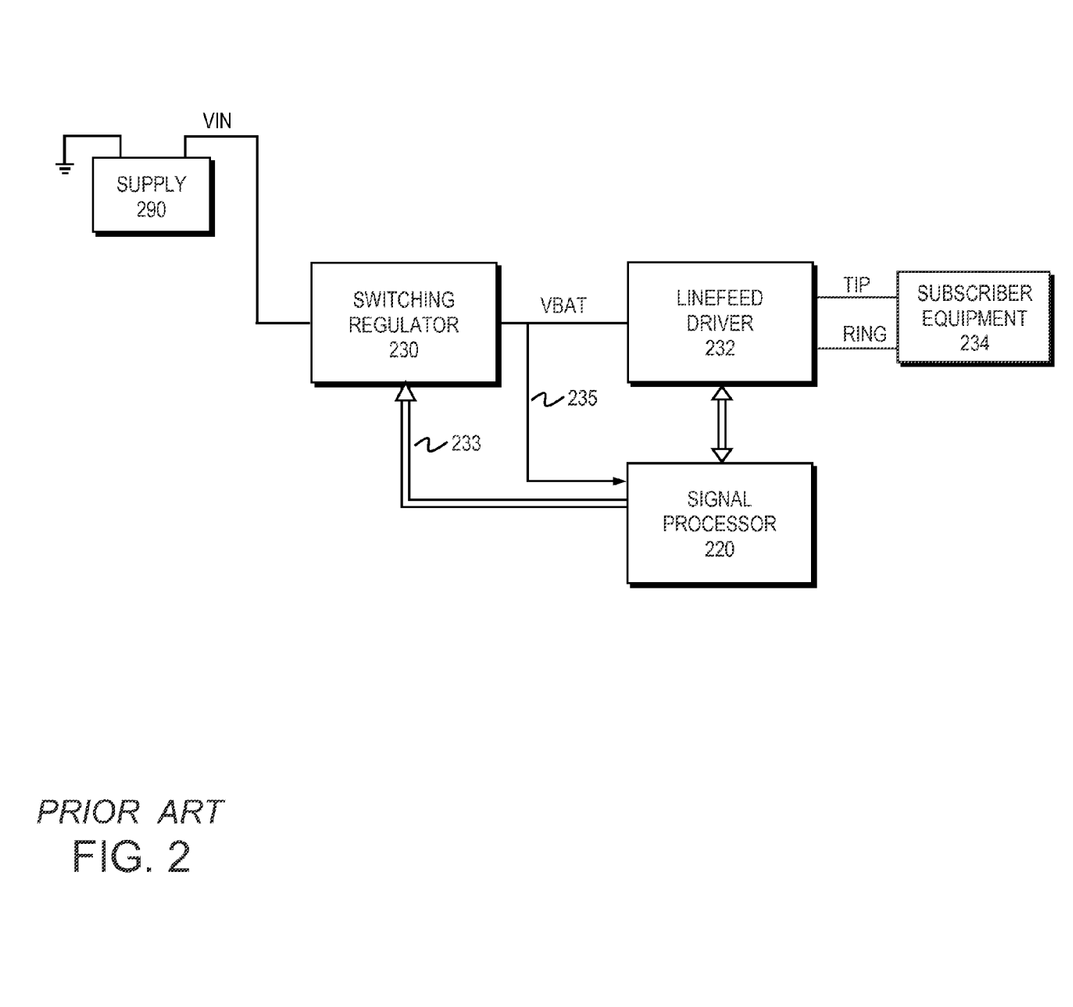
FIG. 2 illustrates one embodiment of a power supply system for a SLIC.

A tracking power supply can be used to provide a VBAT level suitable for the needs of the SLIC. FIG. 2 illustrates one embodiment of a power supply system for a SLIC.

The variable power supply system includes a switching regulator 230. In one embodiment, switching regulator 230 forms a DC-DC converter power supply. The power supply system relies upon a switching regulator or switchers as needed to provide the appropriate VBAT from VIN. In order to avoid confusion with the term "VBAT", the terms VDD or SUPPLY are used to describe the supply from an actual battery or other fixed supply source 290. The term "VBAT" describes the supply provided to the linefeed driver irrespective of whether VBAT is actually provided by any battery.

In the illustrated embodiment VIN is provided by one or more batteries such as battery 290. A switching regulator receives VIN and provides a VBAT. In one embodiment, the switching regulator passes VIN as-is when is idle (i.e., VBAT≈VIN). When commutated, however, the switching regulator boosts VBAT relative to VIN such that $$\left|\frac{VBAT}{VIN}\right| > 1.$$

In the illustrated embodiment, the switching regulator is controlled to adjust VBAT as needed for the particular operational state of the subscriber equipment 234 driven by the linefeed driver 232. Control of the switching regulator is provided by the signal processor 220. The signal processor senses VBAT via sense line 235. The signal processor controls the switching of the switching regulator via switching control 233 to ensure VBAT is maintained at a value targeted by the signal processor. Through control of VBAT, the signal processor tailors VBAT as necessary to meet the supply requirements for the linefeed driver of the subscriber line.

Figure 3:
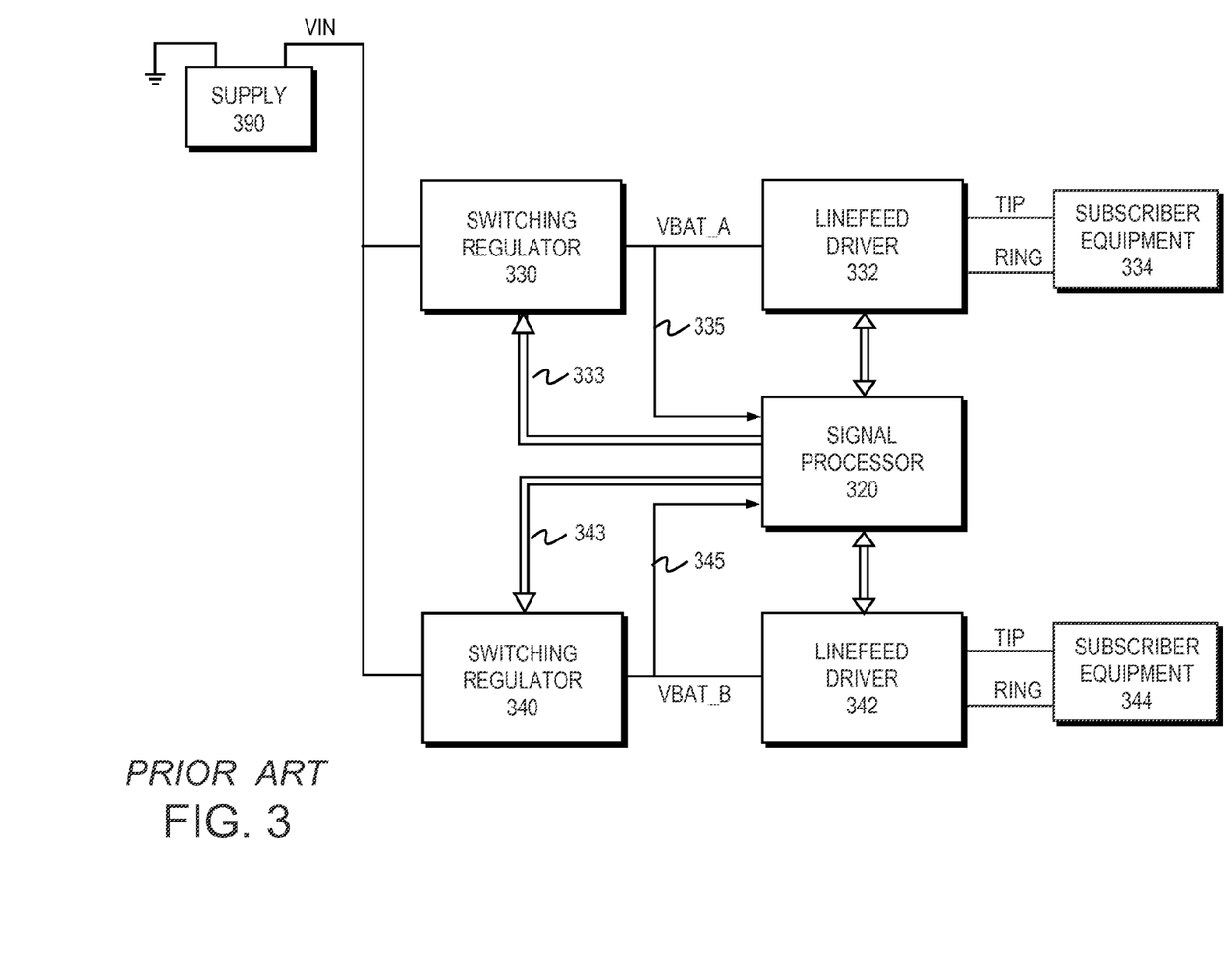
FIG. 3 illustrates a prior art embodiment of a SLIC power supply system for supporting multiple subscriber lines.

FIG. 3 illustrates a prior art embodiment of a SLIC power supply system for supporting multiple subscriber lines. Support for a plurality of subscriber lines may be accommodated by multiple single-channel SLICs or one or more multi-channel SLICs. Each channel requires a dedicated linefeed driver. The term "channel" and "linefeed driver" may generally be used interchangeably for purposes of discussion.

The signal processor of a single-channel SLIC can support only a single linefeed driver. The term "multi-channel SLIC" refers to a single signal processor driving a plurality of linefeed drivers. A single signal processor 320 may be utilized to control multiple linefeed drivers 332, 342 and switching regulators 330, 340 via sense lines 335, 245 and independent switching controls 333, 343. A single supply 390 may be used to provide VIN to all the switching regulators. Switching regulator 330 provides VBAT_A for linefeed driver 332. Switching regulator 340 provides VBAT_B for linefeed driver 342.

Generally, the switching regulators are controlled in accordance with the operational state of the subscriber loop to provide the VBAT needed by their associated linefeed drivers. If both linefeed drivers shared the same VBAT, the generated VBAT must be sufficient to support the linefeed driver with the greatest magnitude voltage requirements as determined by operational state. If the other linefeed driver is not in the same operational state, then excess power will have to be dissipated. Although the individual switching regulators architecture avoids unnecessary wasting of power, it does so at the expense of a requiring a separate switching regulator for each linefeed driver.

Figure 4:
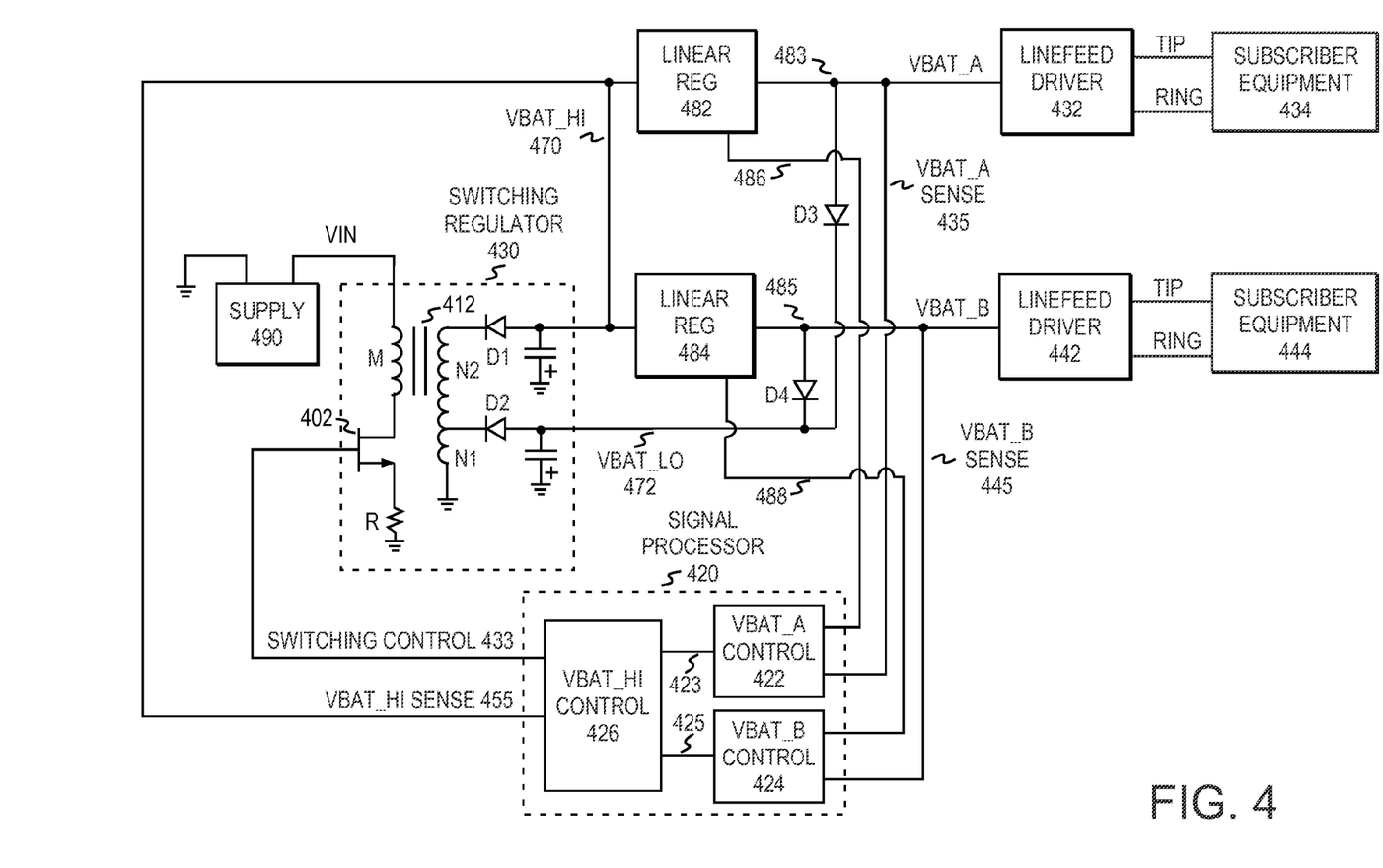
FIG. 4 illustrates one embodiment of an improved power supply system for one or more SLIC linefeed drivers.

FIG. 4 illustrates one embodiment of an improved power supply system for one or more SLIC linefeed drivers. The power supply system includes a switching regulator 430. In one embodiment, switching regulator 430 forms a DC-DC converter power supply. In the illustrated embodiment VIN is provided to the switching regulator by supply 490. Control of the switching regulator is provided by signal processor 420.

The basic components of a switching regulator include a diode, a switch, and an inductor. Feedback and control circuitry are provided to regulate the transfer of energy from input to output and to maintain the desired VBAT supply levels.

In the illustrated embodiment switching regulator 430 provides two VBAT levels—a VBAT_HI and a VBAT_LO. The switching regulator includes a transformer 412 having an M-turn primary winding. The primary winding serves as the inductor for the switching regulator. The transformer includes N1-turn and N2-turn secondary windings (N2<N1). The N1-turn winding and diode D1 produce a VBAT_HI 470 voltage. The N2-turn winding and diode D2 produce a VBAT_LO 472 voltage. In a steady-state environment, VBAT_LO is determined as $$\frac{N1}{N2} \cdot VBAT\_HI$$

In effect, a single switching regulator is utilized to provide a plurality of supply rails. In the illustrated embodiment, the switching regulator is providing two supply rails. The supply rails are shared by the linefeed drivers, however, each linefeed driver will be supplied by the least magnitude supply needed. The switching regulator receives VIN and provides a VBAT_HI and a VBAT_LO. When commutated, the switching regulator boosts VBAT_HI relative to VIN such that $$\left|\frac{VBAT\_HI}{VIN}\right| > 1.$$

In the illustrated embodiment, the switching regulator is an inverting topology such that $$\frac{VBAT\_HI}{VIN} \leq -1 \text{ and } \frac{VBAT\_LO}{VIN} < 0.$$

In one embodiment, the switching component is a field effect transistor 402 controlled by signal processor 420.

VBAT_HI is provided to linear regulators 482, 484. The output of linear regulator 482 is coupled at node 483 through diode D3 to VBAT_LO. Node 483 provides VBAT_A to the linefeed driver 432 for interfacing with subscriber equipment 434. Linefeed driver 432 is associated with "SLIC A" or "channel A" of a multi-channel SLIC.

The output of linear regulator 484 is coupled at node 485 through diode D4 to VBAT_LO. Node 485 provides VBAT_B to the linefeed driver 442 for interfacing with subscriber equipment 444. Linefeed driver 442 is associated with "SLIC B" or "channel B" of a multi-channel SLIC.

VBAT_A control senses the value of VBAT_A via VBAT_A sense 435. VBAT_B control senses the value of VBAT_B via VBAT_B sense 445. VBAT_HI control 426 detects the value of VBAT_HI via VBAT_HI sense 455. VBAT_A control 422 generates control signals to move VBAT_A to a desired value for a first SLIC channel or device. VBAT_B control 424 generates control signals to move VBAT_B to a desired value for a second SLIC channel or device. The VBAT_A target signal and VBAT_B target signal are provided to VBAT_HI control 426. The output of the VBAT_A control and the VBAT_B control blocks represent the target VBAT values for channels A and B, respectively.

VBAT_HI control selects between the VBAT_A target and the VBAT_B target by selecting the value (controlling channel target) having the characteristic that the magnitude is a maximum of the magnitudes of all other controls. The target value for VBAT_HI control 426 is based on this controlling channel target. In one embodiment, the target value for VBAT_HI 426 is selected by adding an overhead offset to the controlling channel target. VBAT_HI control then controls the switching component 402 of switching regulator 430 via switch control 433. Control of the commutation of switching component 402 causes the voltage at VBAT_HI 470 to converge to the selected VBAT_HI target value. In one embodiment, VBAT_HI control, VBAT_A control, and VBAT_B control all reside within or are functions controlled by signal processor 420.

The VBAT_HI voltage is made available to supply the linear regulators associated with each channel. VBAT_A control 422 provides a linear regulator control 486 to linear regulator 482 in order to cause the output of linear regulator 482 to meet the target VBAT_A value. VBAT_B control 424 provides a linear regulator control 488 to linear regulator 484 in order to cause the output of linear regulator 484 to meet the target VBAT_B value.

If VBAT_LO is sufficient to meet the needs of a specific linefeed driver then the linear regulator associated with that driver will effectively shut down due to the diode coupling of the output nodes 483, 485 to VBAT_LO and VBAT_LO will be provided to the specific linefeed driver 432, 442 as VBAT_A or VBAT_B, respectively. If VBAT_LO is insufficient to meet the needs of a specific linefeed driver, then the linear regulator associated with that linefeed driver will draw from VBAT_HI to and will serve to offload excess power that would otherwise be consumed by the SLIC if supplied directly by VBAT_HI.

Although operational mode may dictate the target values for VBAT_HI, the manner in which both VBAT_HI and VBAT_LO are made available to the supply node 483, 485 for the individual linefeed drivers ensures that the timing of the selection of VBAT_HI or VBAT_LO is not limited to being coterminous with the transitions between operational states. In particular, the supply utilized by each subscriber line interface circuit may change during a given operational mode. VBAT_LO is utilized except when VBAT_LO is insufficient to meet the demands of a SLIC.

The architecture of FIG. 4 may be readily extended to accommodate a plurality greater than two channels irrespective of the allocation of channels to SLIC integrated circuit devices. Preferably there is a linear regulator having its input coupled to VBAT_HI and its output diode-coupled to VBAT_LO for each SLIC channel (there is a one-to-one relationship between SLIC channels and subscriber lines). In one embodiment, there is at least one linear regulator having its input coupled to VBAT_HI and its output diode-coupled to VBAT_LO for each SLIC signal processor.

Figure 5:
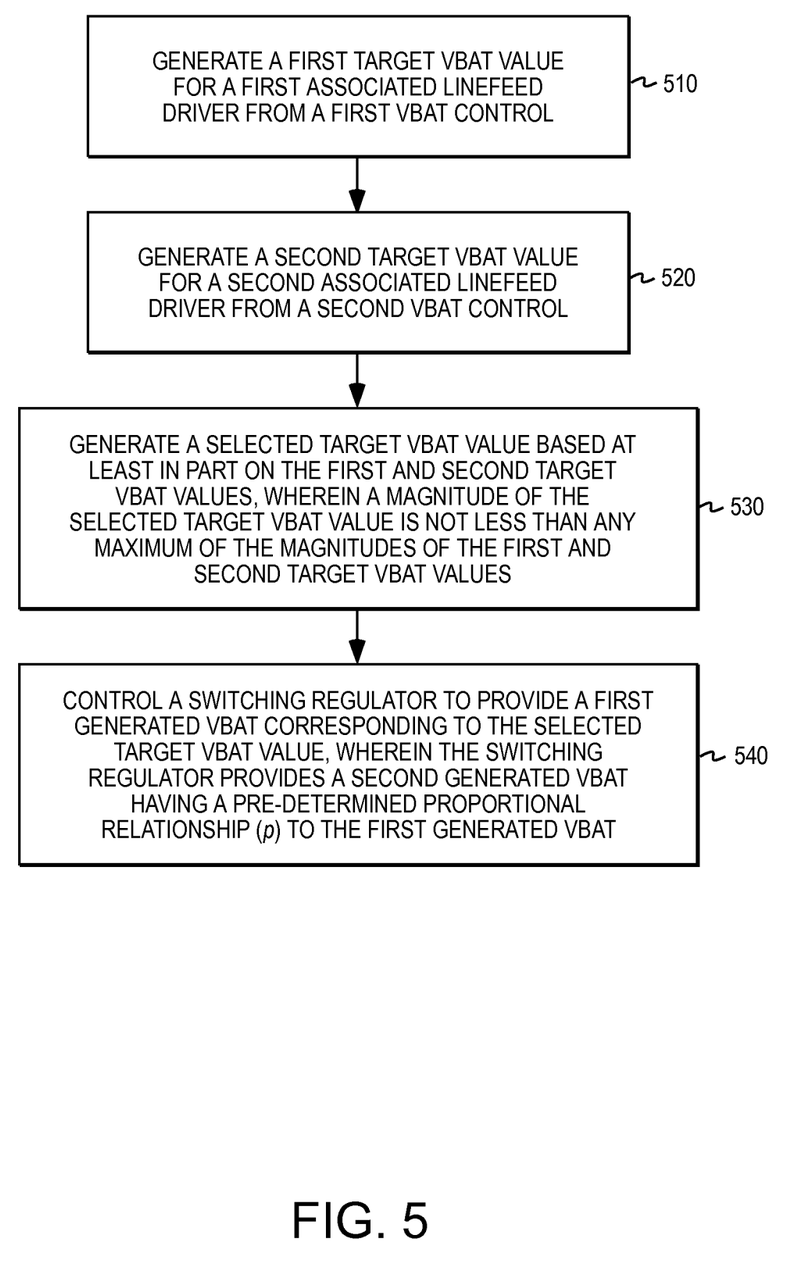
FIG. 5 illustrates one embodiment of a method of generating VBAT for a plurality of SLIC linefeed drivers (i.e., channels).

FIG. 5 illustrates one embodiment of a method of generating VBAT for a plurality of SLIC linefeed drivers (i.e., channels). Parenthetical references will be made to elements from FIG. 4 to illustrate operation of the apparatus of FIG. 4 in accordance with the method illustrated in FIG. 5.

At step 510, a first target VBAT value (423) is generated for a first associated linefeed driver (432) from a first VBAT control (422). At 520, a second target VBAT value (425) is generated for a second associated linefeed driver (442) from a second VBAT control (424).

At 530, a selected target VBAT value is selected based at least in part on the first and second target VBAT values. A magnitude of the selected target VBAT value is not less than any maximum of the magnitudes of the first and second target VBAT values. For positive VBAT values, the maximum of the first and second target VBAT values is "floor" value that the selected target VBAT value should not fall below. For negative VBAT values, the minimum of the first and second target VBAT values is a "ceiling" that the selected target VBAT value should not exceed. In one embodiment, the selected target VBAT value is a selected one of the first and second target VBAT values having a greatest magnitude.

With respect to FIG. 4, for example, the selection of appropriate selected VBAT value is performed by VBAT_HI control 426. At 540, a switching regulator (430) is controlled (433) in accordance with the selected target VBAT value. The switching regulator provides a first generated VBAT (VBAT_HI 470) corresponding to the selected target VBAT value. The switching regulator provides a second generated VBAT (VBAT_LO 472) having a pre-determined proportional relationship (p) to the first generated VBAT. With respect to FIG. 4, the proportional steady state relationship is $$p = \frac{N1}{N2},$$

where N1 and N2 correspond to the number of turns for the secondary windings feeding each of the first generated VBAT and the second generated VBAT, respectively (i.e., $$\left(i.e., \text{VBAT\_LO} = \frac{N1}{N2} \cdot \text{VBAT\_HI}\right).$$

In various embodiments $p \leq \frac{1}{2}$, $p \leq \frac{1}{3}$.

The voltage difference between VBAT_HI and VBAT_LO and the ability to select between VBAT_HI and VBAT_LO at any time independently of operational state allows for reducing the voltage drop that would appear across either the linear regulator or the linefeed driver due to excessive supply levels when VBAT_LO is providing sufficient supply levels for a SLIC to select.

Considerably more power is drawn by subscriber equipment in an off-hook state as opposed to subscriber equipment in an on-hook state. Even though the voltage required for on-hook operation is greater than the voltage required for off-hook operation, an increase in current requirements results in a higher power consumption in the off-hook state. The ratio of wasted power per increase in supply voltage (magnitude) is such that an off-hook channel will typically waste considerably more power per excess volt than will an on-hook channel. If VBAT_LO is not sufficient to supply the off-hook channel, then the off-hook channel will be drawing its VBAT from VBAT_HI and associated linear regulator. When all channels are in the same off-hook state, VBAT_HI is likely to be better matched to the supply level actually needed by the associated linefeed drivers. When one or more channels are in an on-hook state, however, the selected target VBAT value (magnitude) is increased to meet the on-hook needs. The VBAT_LO that would be produced as a fraction of the VBAT_HI (that was selected based upon the minimum requirements for supporting an on-hook channel) will likely be insufficient to supply VBAT for the off-hook channels (depending upon typical on-hook/off-hook supply requirements and VBAT_LO/VBAT_HI relationship).

The selection approach set forth in FIG. 5 will inherently favor selecting an on-hook channel's target VBAT as between an on-hook and off-hook target VBAT if one channel is off-hook and the other is on-hook. One implementation of the method of FIG. 5 "bumps up" the selected target VBAT value (magnitude) for an on-hook channel when at least one other channel is off-hook to ensure that off-hook channels can be supplied from VBAT_LO. The amount of the "bump up" depends upon the off-hook VBAT requirements and the proportionality relationship (p) between the VBAT_LO and VBAT_HI provided by the switching regulator. In brief, the selected target VBAT value for an on-hook channel is increased (magnitude) beyond the requirements of the on-hook channel. The selected target VBAT value is scaled to move the generated VBAT_HI to a sufficient level such that the generated VBAT_LO is capable of supporting an off-hook channel.

Although channels or devices utilizing VBAT_HI will experience an increase in wasted power due to larger potential voltage drops across the linear regulator or the linefeed driver, the power potentially saved when off-hook devices can stay on VBAT_LO is much greater than the incremental power wasted by the increased VBAT_HI for the on-hook channels. The amount of savings that can be achieved depends predominately upon the number of channels and the proportionality ratio between VBAT_LO and VBAT_HI. For the switching regulator of FIG. 4, the proportionality ratio p is determined by the ratio of the secondary windings such that $$p = \frac{N1}{N2}.$$

Figure 6:
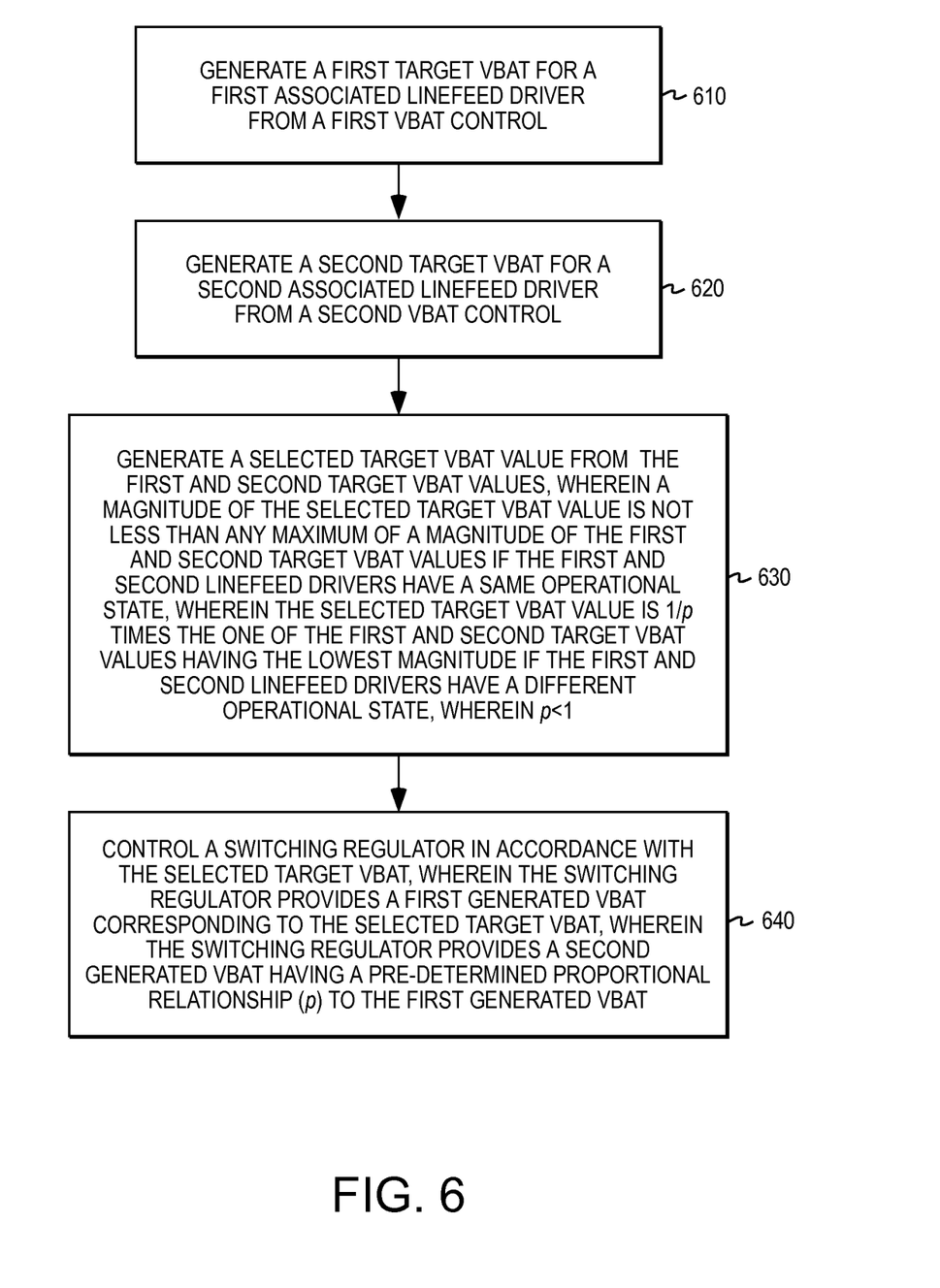
FIG. 6 illustrates one embodiment of a method of generating VBAT for a plurality of SLIC linefeed drivers (i.e., channels).

FIG. 6 illustrates one embodiment of a method of generating VBAT for a plurality of SLIC linefeed drivers. Generally, VBAT_HI will track the VBAT_A or VBAT_B having the greatest magnitude. An exception is made when one or more of the channels are in an off-hook state while one or more of the channels are in an on-hook state.

Information about the state can be made available by the signal processor 422 to the VBAT_HI control 426. Alternatively, the VBAT_HI control can infer state based upon the target VBAT_A value 422 and the target VBAT_B value 424 relative to pre-determined thresholds. Parenthetical references will be made to elements from FIG. 4 to illustrate operation of the apparatus of FIG. 4 in accordance with the method illustrated in FIG. 6.

At step 610, a first target VBAT value (423) is generated for a first associated linefeed driver (432) from a first VBAT control (422). At 620, a second target VBAT value (425) is generated for a second associated linefeed driver (442) from a second VBAT control (424). At 630, a selected target VBAT value is generated based upon the first target VBAT and second target VBAT. The selected target VBAT value is a selected one of the first and second target VBAT values having a greatest magnitude if the linefeed drivers have the same operational state (e.g., both on-hook or both off-hook). The selected target VBAT value is at least $$\frac{1}{p}$$

times the one of the first and second target VBAT value having the lowest magnitude if the linefeed drivers are in different operational states, wherein p<1. With respect to FIG. 4, the generation of the selected target VBAT value is performed by VBAT_HI control 426.

At 640, a switching regulator (430) is controlled (433) in accordance with the selected target VBAT value. The switching regulator provides a first generated VBAT (VBAT_HI 470) corresponding to the selected target VBAT value. The switching regulator provides a second generated VBAT (VBAT_LO 472) having a pre-determined proportional relationship p to the first generated VBAT. With respect to FIG. 4, the proportional steady state relationship between the generated VBATs is $$\frac{N1}{N2}$$

$$\left(i.e., p = \frac{N1}{N2}\right)$$

where N1 and N2 correspond to the number of turns for the secondary windings feeding each of the first generated VBAT and the second generated VBAT, respectively (i.e., $$\left(i.e., \text{VBAT\_LO} = p \cdot \text{VBAT\_HI} = \frac{N1}{N2} \cdot \text{VBAT\_HI}\right).$$

In the preceding detailed description, the invention is described with reference to specific exemplary embodiments thereof. Various modifications and changes may be made thereto without departing from the broader scope of the invention as set forth in the claims. The specification and drawings are, accordingly, to be regarded in an illustrative rather than a restrictive sense.

What is claimed is:

1. A method of generating a plurality of supply voltages for a plurality of subscriber line channels, comprising:
    a) generating a first target VBAT value for a first associated linefeed driver from a first VBAT control;
    b) generating a second target VBAT value for a second associated linefeed driver from a second VBAT control;
    c) generating a selected target VBAT value based at least in part on the first and second target VBAT values, wherein a magnitude of the selected target VBAT value is not less than any maximum of a magnitude of the first and second target VBAT values; and
    d) controlling a switching regulator to provide a first generated VBAT corresponding to the selected target VBAT value, wherein the switching regulator provides a second generated VBAT having a pre-determined proportional relationship (p) to the first generated VBAT.

2. The method of claim 1 wherein the switching regulator comprises a transformer having a primary winding and a plurality of secondary windings including an N1 turn secondary winding providing the first generated VBAT and an N2 turn secondary winding providing the second generated VBAT, wherein the pre-determined proportional relationship p=second generated VBAT/first generated $$VBAT = \frac{N1}{N2}.$$

3. The method of claim 1 wherein the first and second VBAT controls are implemented within an integrated circuit signal processor.

4. The method of claim 1 wherein the first generated VBAT supplies a first linear regulator having an output node coupled to the first associated linefeed driver, wherein the output node is diode-coupled to receive the second generated VBAT.

5. The method of claim 1 wherein the selected target VBAT value is a selected one of the first and second target VBAT values having a greatest magnitude.

6. The method of claim 1 wherein $p \leq \frac{1}{2}$.

7. The method of claim 6 wherein $p \leq \frac{1}{3}$.

8. A method of generating a plurality of supply voltages for a plurality of subscriber line linefeed drivers, comprising:
 a) generating a first target VBAT value for a first associated linefeed driver from a first VBAT control;
 b) generating a second target VBAT value for a second associated linefeed driver from a second VBAT control;
 c) generating a selected target VBAT value from the first and second target VBAT values, wherein a magnitude of the selected target VBAT value is not less than any maximum of a magnitude of the first and second target VBAT values if the first and second linefeed drivers have a same operational state, wherein the selected target VBAT value is $$\frac{1}{p}$$

times the one of the first and second target VBAT values having the lowest magnitude if the first and second linefeed drivers have different operational states, wherein $p<1$; and
 d) controlling a switching regulator to provide a first generated VBAT corresponding to the selected target VBAT value, wherein the switching regulator provides a second generated VBAT having a pre-determined proportional relationship (p) to the first generated VBAT.

9. The method of claim 8 wherein the switching regulator comprises a transformer having a primary winding and a plurality of secondary windings including an N1 turn secondary winding providing the first generated VBAT and an N2 turn secondary winding providing the second generated VBAT, wherein the pre-determined proportional relationship p=second generated VBAT/first generated $$VBAT = \frac{N1}{N2}.$$

10. The method of claim 8 wherein the first and second VBAT controls are implemented within an integrated circuit signal processor.

11. The method of claim 8 wherein the first generated VBAT supplies a first linear regulator having an output node coupled to the first associated linefeed driver, wherein the output node is diode-coupled to receive the second generated VBAT.

12. The method of claim 8 wherein the linefeed drivers have a same operational state, wherein the selected target VBAT value is a selected one of the first and second target VBAT values having a greatest magnitude.

13. An apparatus for providing a plurality of supply levels to a plurality of subscriber line linefeed drivers, comprising:
 a switching regulator providing a first generated VBAT corresponding to a selected target VBAT value, wherein the switching regulator provides a second generated VBAT having a pre-determined proportional relationship (p) to the first generated VBAT;
 a linear regulator receiving the first generated VBAT, wherein an output of the linear regulator is coupled to a node supplying a first linefeed driver; and
 a diode coupling the node to the second generated VBAT;
 wherein the switching regulator comprises a transformer having a primary winding and a plurality of secondary windings including an N1 turn secondary winding providing the first generated VBAT and an N2 turn secondary winding providing the second generated VBAT, wherein the pre-determined proportional relationship p=second generated VBAT/first generated $$VBAT = \frac{N1}{N2}.$$

* * * * *